(12) United States Patent
Wackerly

(10) Patent No.: US 9,199,150 B2
(45) Date of Patent: Dec. 1, 2015

(54) SPORTS TRAINING SYSTEM

(71) Applicant: Paul J. Wackerly, Canton, OH (US)

(72) Inventor: Paul J. Wackerly, Canton, OH (US)

( * ) Notice: Subject to any disclaimer, the term of this patent is extended or adjusted under 35 U.S.C. 154(b) by 49 days.

(21) Appl. No.: 14/107,238

(22) Filed: Dec. 16, 2013

(65) Prior Publication Data

US 2015/0165294 A1    Jun. 18, 2015

(51) Int. Cl.
*A63B 69/00* (2006.01)
*A63B 67/00* (2006.01)
*A63B 24/00* (2006.01)
*A63B 63/00* (2006.01)

(52) U.S. Cl.
CPC ......... *A63B 69/0071* (2013.01); *A63B 24/0021* (2013.01); *A63B 63/00* (2013.01); *A63B 67/00* (2013.01); *A63B 2024/0056* (2013.01); *A63B 2220/13* (2013.01); *A63B 2220/20* (2013.01); *A63B 2220/30* (2013.01); *A63B 2220/56* (2013.01); *A63B 2225/093* (2013.01)

(58) Field of Classification Search
CPC .............. A63B 69/0071; A63B 63/06; A63B 69/0015; A63B 2069/0006; A63B 63/083; A63B 63/08; A63B 69/0002; A63B 69/00
USPC ................ 473/447, 422, 454, 448, 433, 446
See application file for complete search history.

(56) References Cited

U.S. PATENT DOCUMENTS

| | | | | |
|---|---|---|---|---|
| 4,565,527 A * | 1/1986 | Burchett | | 434/248 |
| 5,485,993 A * | 1/1996 | Lipsett | | 473/448 |
| 5,599,016 A * | 2/1997 | Larkin | | 473/448 |
| 5,800,291 A * | 9/1998 | Grover | | 473/447 |
| 5,800,297 A * | 9/1998 | Aldstadt | | 473/490 |
| 5,813,926 A * | 9/1998 | Vance | | 473/448 |
| 6,312,349 B1 * | 11/2001 | Roberts | | 473/448 |
| 6,430,819 B1 * | 8/2002 | Aldstadt et al. | | 473/490 |
| 6,544,132 B1 * | 4/2003 | Tvedt | | 473/448 |
| 6,679,794 B1 * | 1/2004 | Vitello et al. | | 473/433 |
| 6,916,256 B1 * | 7/2005 | Buster et al. | | 473/451 |
| 7,175,549 B2 * | 2/2007 | LeFlore | | 473/448 |
| 7,976,413 B2 * | 7/2011 | Meltzer et al. | | 473/454 |
| 8,113,969 B1 * | 2/2012 | Martin | A63B 69/0071 | 473/422 |
| 8,409,036 B1 * | 4/2013 | Khananayev | A63B 69/0071 | 473/447 |
| 8,617,008 B2 * | 12/2013 | Marty | A63B 69/0071 | 473/422 |
| 8,647,220 B2 * | 2/2014 | Lloyd | | 473/422 |

(Continued)

OTHER PUBLICATIONS

"In Basketball, Shooting Angle Has a Big Effect on the Chances of Scoring." Washington Post. The Washington Post, Mar. 16, 2010. Web. Dec. 14, 2013. <http://www.washingtonpost.com/wp-dyn/content/article/2010/03/15/AR2010031502Ol>.

*Primary Examiner* — Mitra Aryanpour

(74) *Attorney, Agent, or Firm* — Sand & Sebolt; Howard L. Wernow

(57) ABSTRACT

The sports training system of the present invention is preferably used in association with the sport of basketball to improve a player's shooting and dribbling fundamentals. The system includes a tower positioned between the player shooting the ball and the basketball hoop. The tower requires the player to shoot the ball over the top of the tower. The act of shooting the ball over the tower requires the player to have a preferred release angle, which in turn, causes the ball to descend towards the hoop at a preferred entrance angle. The system also includes a pad configured to be stood upon by the player, which ensures that the player's feet are properly aligned with the basketball hoop. The system may also have a core training apparatus to improve a player's dribbling fundamentals by requiring the player to dribble the ball in a crouched athletic stance.

11 Claims, 12 Drawing Sheets

(56) References Cited

U.S. PATENT DOCUMENTS

| | | | |
|---|---|---|---|
| 8,758,173 B2* | 6/2014 | Goodman | A63B 69/0071 473/447 |
| 8,908,922 B2* | 12/2014 | Marty | G06T 7/2033 382/103 |
| 2002/0098947 A1* | 7/2002 | Brown | A63B 26/00 482/23 |
| 2005/0192126 A1* | 9/2005 | Remaklus | 473/447 |
| 2006/0003856 A1* | 1/2006 | Bennett et al. | 473/447 |
| 2007/0010354 A1* | 1/2007 | White | 473/447 |
| 2008/0280704 A1* | 11/2008 | Noll | A63B 69/0071 473/447 |
| 2010/0160093 A1* | 6/2010 | Macarthur | 473/447 |
| 2014/0171229 A1* | 6/2014 | Klunick | 473/447 |
| 2014/0200102 A1* | 7/2014 | Frostino | 473/447 |

* cited by examiner

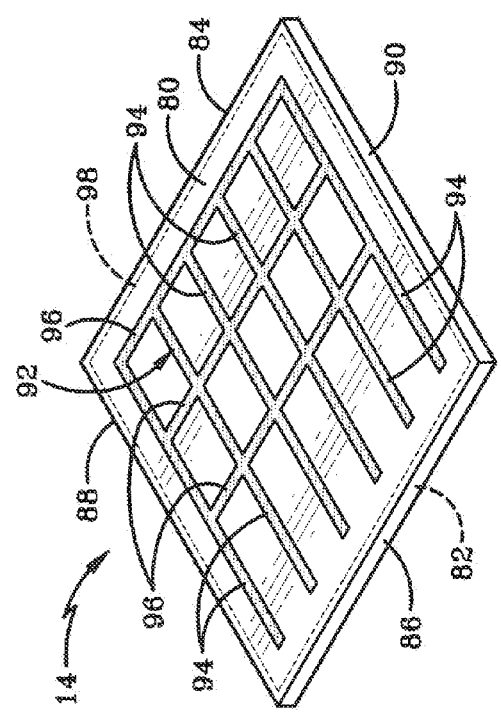
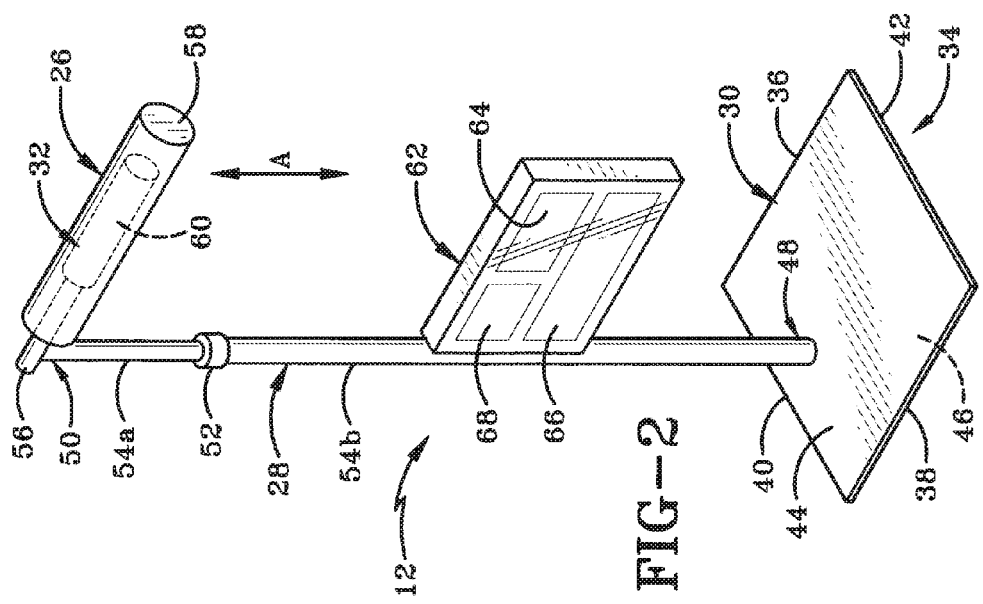

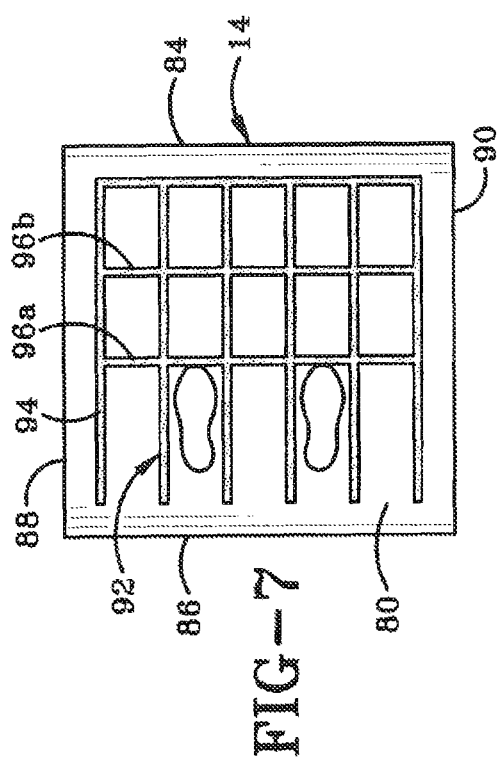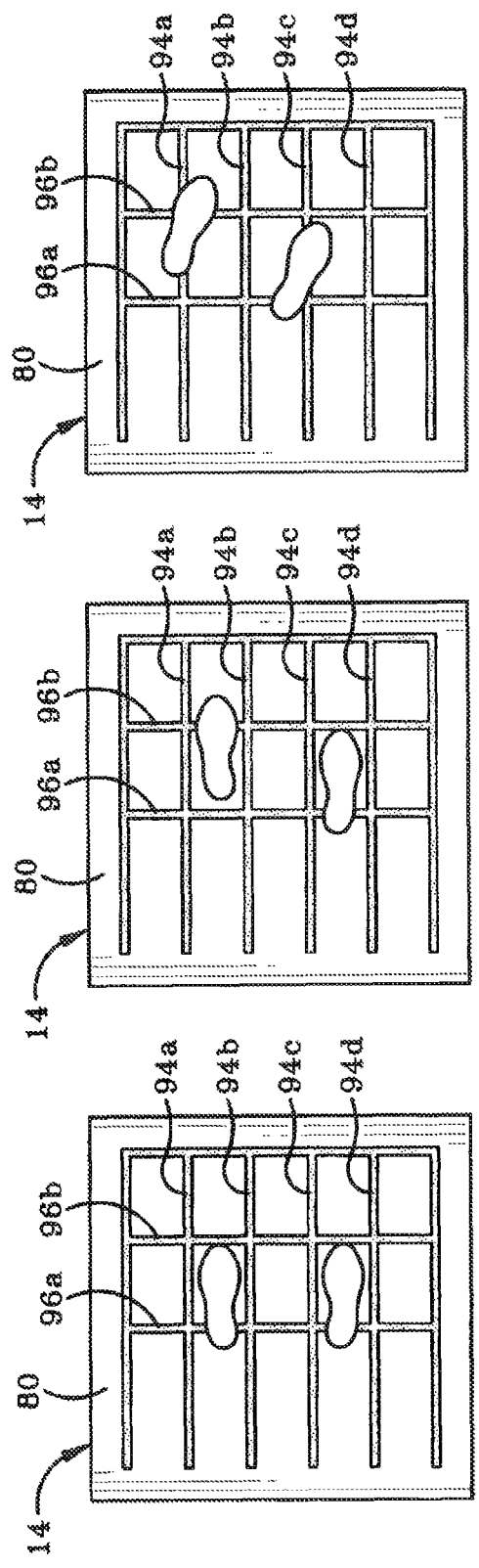

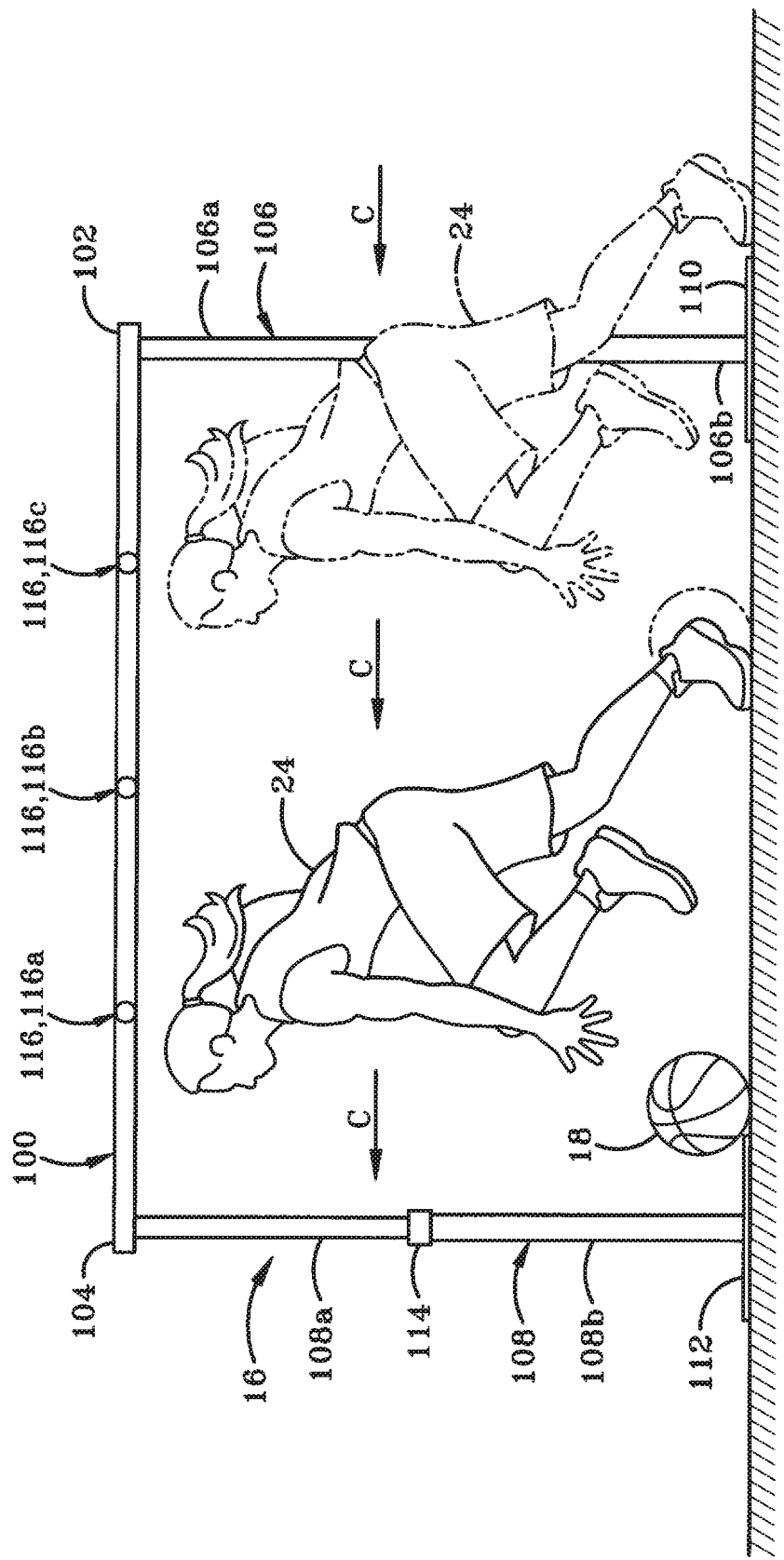

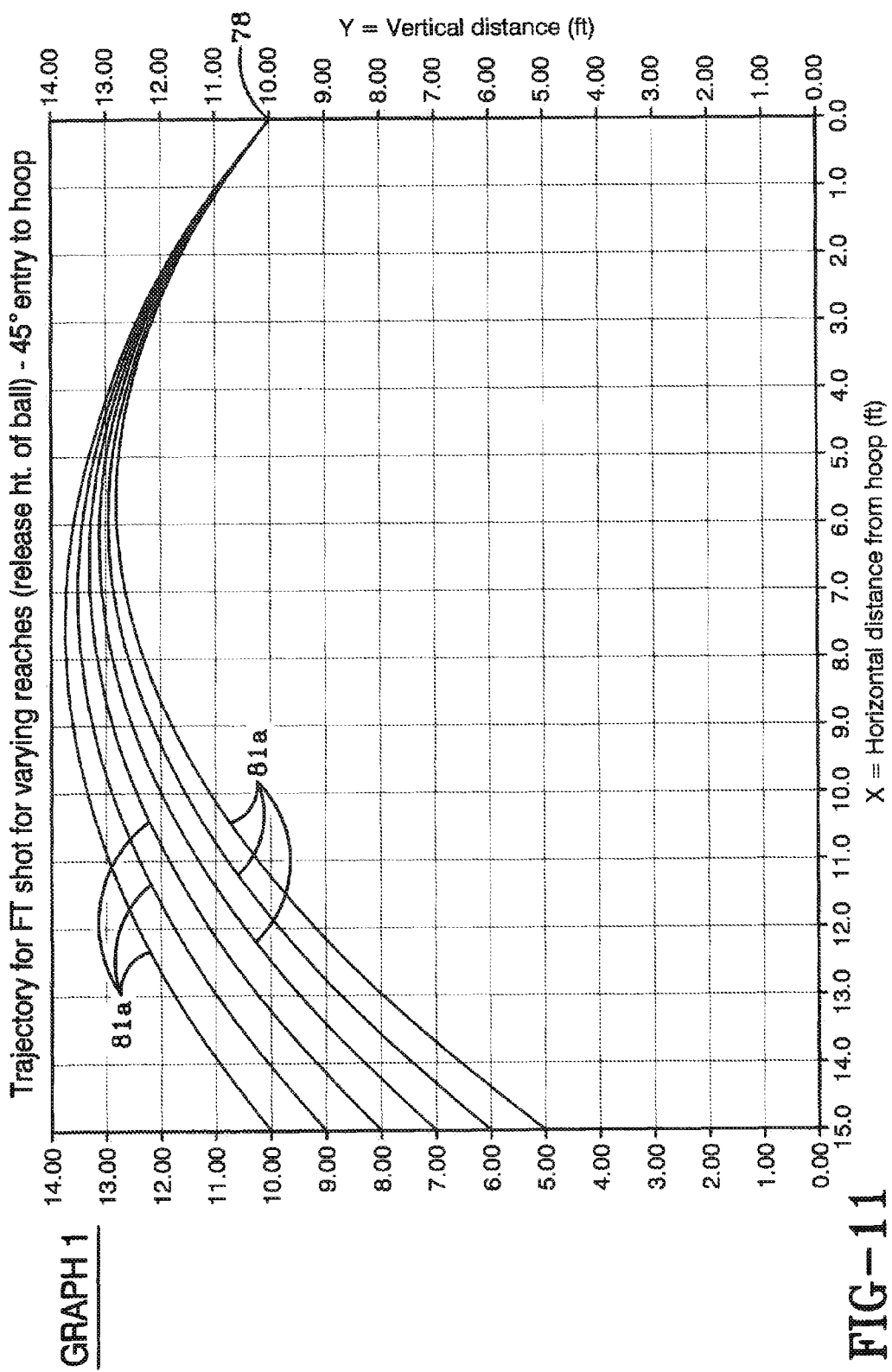

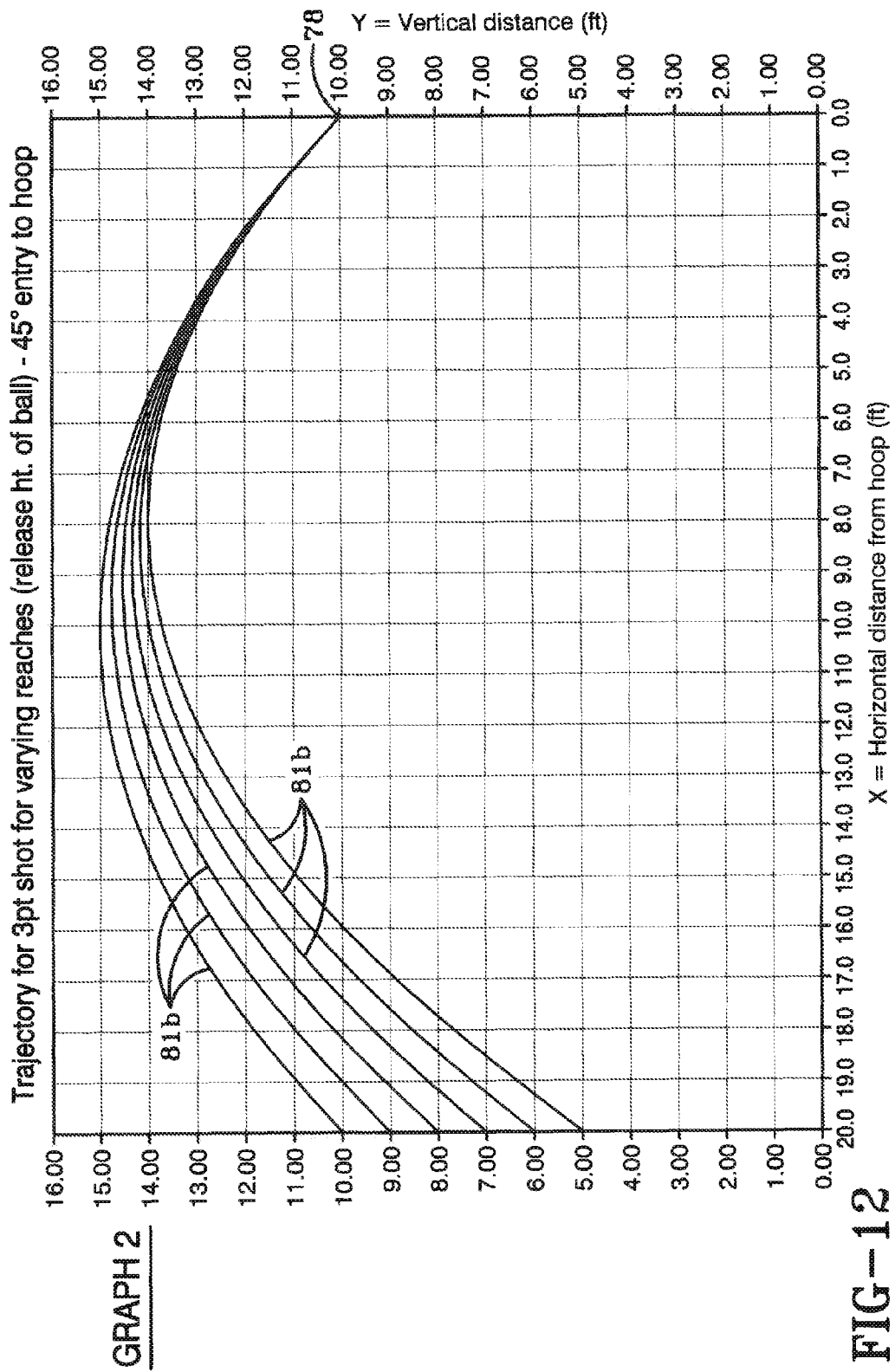

TABLE 1

| REACH HEIGHT | MEASUREMENT | SHOT DISTANCE | | |
|---|---|---|---|---|
| | | 10' | 15' | 20' |
| 5'6" | Release Angle (Deg) | 58 - 68 | 55 - 62 | 49 - 58 |
| | Shot Speed (MPH) | 14.5 - 16 | 16.5 - 18 | 19 - 20 |
| | Shooters Mark Height | 87" (2') | 85" (2') | 85" (3') |
| 6' | Release Angle (Deg) | 56 - 66 | 53 - 61 | 52 - 62 |
| | Shot Speed (MPH) | 14 - 16 | 16.5 - 18 | 18.5 - 20.5 |
| | Shooters Mark Height | 92" (2') | 90" (2') | 90" (3') |
| 6'6" | Release Angle (Deg) | 55 - 62 | 53 - 61 | 50 - 60 |
| | Shot Speed (MPH) | 13.5 - 15.5 | 16 - 17.5 | 18.5 - 20 |
| | Shooters Mark Height | 100" (2') | 98" (2') | 98" (3') |
| 7' | Release Angle (Deg) | 54 - 61 | 52 - 60 | 49 - 57 |
| | Shot Speed (MPH) | 13.3 - 15 | 15.9 - 17.4 | 18.2 - 20 |
| | Shooters Mark Height | 104" (2') | 102" (2') | 102" (3') |
| 7'6" | Release Angle (Deg) | 52 - 59 | 51 - 60 | 48 - 55 |
| | Shot Speed (MPH) | 13.1 - 14.6 | 15.7 - 17.2 | 18.3 - 20 |
| | Shooters Mark Height | 111" (2') | 109" (2') | 109" (3') |
| 8' | Release Angle (Deg) | 51 - 56 | 49 - 59 | 48 - 55 |
| | Shot Speed (MPH) | 12.7 - 14.2 | 15.4 - 16.9 | 18.1 - 20 |
| | Shooters Mark Height | 116" (2') | 114" (2') | 114" (3') |
| 8'6" | Release Angle (Deg) | 50 - 55 | 48 - 57 | 47 - 55 |
| | Shot Speed (MPH) | 12.3 - 13.8 | 15.4 - 16.9 | 17.9 - 19.9 |
| | Shooters Mark Height | 123" (2') | 121" (2') | 121" (3') |
| 9' | Release Angle (Deg) | 48 - 54 | 47 - 56 | 46 - 57 |
| | Shot Speed (MPH) | 12.1 - 13.6 | 15.3 - 16.4 | 17.8 - 19 |
| | Shooters Mark Height | 129" (2') | 127" (2') | 127" (3') |
| 9'6" | Release Angle (Deg) | 46 - 53 | 46 - 57 | 45 - 60 |
| | Shot Speed (MPH) | 11.8 - 13.3 | 14.9 - 15.9 | 17.8 - 19 |
| | Shooters Mark Height | 132" (2') | 130" (2') | 130" (3') |
| 10' | Release Angle (Deg) | 45 - 55 | 45 - 60 | 45 - 60 |
| | Shot Speed (MPH) | 11.5 - 13 | 14.8 - 16.3 | 17.5 - 19 |
| | Shooters Mark Height | 138" (2') | 136" (2') | 136" (3') |

FIG-13

SPORTS TRAINING SYSTEM

BACKGROUND OF THE INVENTION

1. Technical Field

The present invention relates generally to a sports training system. More particularly the present invention relates to a sports training system including a tower positioned between a player and a basketball hoop and a pad configured for the player to stand upon. Specifically, the tower is configured to require the player to shoot the basketball over the top of a cross bar at a preferred shot speed to cause the basketball to move towards the basketball hoop at a preferred entrance angle.

2. Background Information

The sport of basketball is a fun sport that may be enjoyed by all types of players, young and old, having varying degrees of skills. The basic fundamentals of the sport require dribbling a basketball and then either passing the ball to another player or shooting the ball towards a round rim, which is part of a basketball hoop, with the purpose of moving the ball through the rim to score a point. Improving a player's passing and shooting fundamentals greatly increases their overall skill at the sport.

Many young basketball players have improper fundamentals. Some exemplary and common mistakes or improper fundamentals are when players are not in an athletic or crouched stance when dribbling the basketball. This upright or non-crouched stance often leads the player to be unbalanced while dribbling and shooting the basketball. Further, other players often have their feet improperly aligned when they are shooting the basketball. Another improper fundamental player's often exhibit is shooting the basketball at a release angle that is too small or low, which causes the basketball to descend towards the rim or hoop at an entrance angle that is too small. Further, yet another improper fundamental shooting the basketball at a velocity that is either too slow or too fast.

The present invention addresses these and other issues.

SUMMARY

The sports training system of the present invention is preferably used in association with the sport of basketball to improve an athlete or player's shooting and dribbling fundamentals. The system includes a tower positioned between the player and the basketball hoop. The tower requires the player to shoot the ball over the top of the tower. The act of shooting the ball over the tower requires the player to have a preferred release angle, which in turn, causes the ball to descend towards the hoop at a preferred entrance angle. The system also includes a pad configured to be stood upon by the player, which ensures that the player's feet are properly aligned with the basketball hoop. The system may also have a core training apparatus to improve a player's dribbling fundamentals by requiring the player to dribble the ball in a crouched athletic stance.

In one aspect, the invention may provide a sports training system comprising: a ball shot by a player towards a hoop; and a tower having a top, wherein the top of the tower is longitudinally positioned between the hoop and the player, and wherein the ball passes over the top of the tower as the ball travels towards the hoop.

In another aspect, the invention may provide a sports training system includes: a cross bar attached adjacent the top of a vertical member, wherein the cross bar is positioned longitudinally between a person holding a ball and a hoop, wherein the system requires the person to shoot the ball at a release angle such that the object travels vertically over the top of the cross bar towards the hoop and the object approaches the hoop at a preferred entrance angle.

Another aspect of an embodiment of the invention may provide a sports training system comprising: a tower, the tower including: a base member adapted to rest atop the ground; a vertical support member extending upwardly from the base member; a crossbar extending outwardly from the vertical support member; wherein the tower is positioned between a player and a target.

In another aspect, the invention may provide a method of shooting a ball towards a hoop comprising the steps of: providing a cross bar positioned between a player and the hoop; and shooting the ball towards the hoop at a speed from about 11 mph to about 21 mph, wherein the ball travels over the top of the cross bar, and the ball enters the hoop at an entrance angle from about 42 to about 48 degrees relative to horizontal.

Another aspect of an embodiment may provide a method of training an athlete's shooting technique comprising the steps of: providing a tower including a base, a vertical support member extending upwardly from the base, and a cross bar extending outwardly from the support member; positioning the tower longitudinally between a trajectory start point and a trajectory end point; moving an object along a trajectory pathway, the pathway extending from the trajectory start point to the trajectory end point, wherein the a portion of the trajectory pathway is above a portion of the tower.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2 is an enlarged perspective view of the tower;

FIG. 3 is an enlarged perspective view of the pad depicting a plurality of printed lines atop the pad;

FIG. 7 is a top view of the player's feet placement atop the pad in a pre-shot position;

FIG. 8A is a top view of the player's feet placement atop the pad in a proper post-shot position;

FIG. 8B is a top view of the player's feet placement atop the pad in a first improper post-shot position;

FIG. 8C is a top view of the player's feet placement atop the pad in a second improper post-shot position;

FIG. 10 is an operational side view of the core training apparatus depicting the player in an athletic stance traveling beneath a plurality of tines;

FIG. 11 is a first graph or Graph 1 depicting the trajectory heights for a free throw shot for a plurality of reaches or initial release height of the ball;

FIG. 12 is a second graph or Graph 2 depicting the trajectory heights for a 3-point shot for a plurality of initial release heights of the ball;

FIG. 13 is a first table or Table 1 depicting the release angle range values, the shot speed range values, and the cross bar height or Shooter's Mark Height for a plurality of initial release heights of the ball at a given shot distance.

Similar numbers refer to similar parts throughout the drawings.

DETAILED DESCRIPTION

Figure 1:
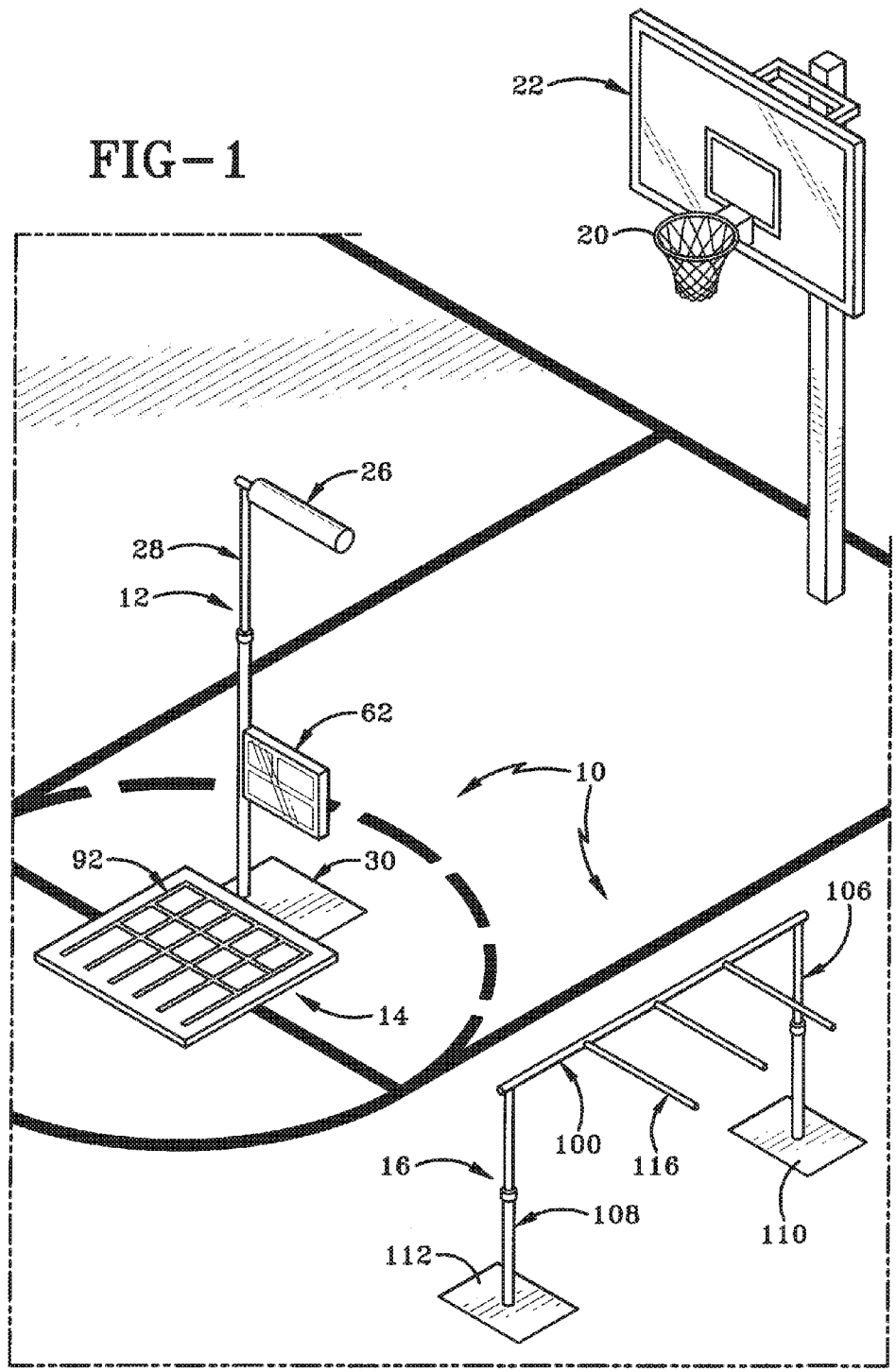
FIG. 1 is a perspective view of the sports training system of the present invention depicting a tower or electronic device having a top cross bar positioned between a basketball hoop and a floor pad, and a core training apparatus positioned adjacent the pad and tower.

As shown in FIG. 1, a sports training system 10 includes a speed measuring tower 12, a balance and power measuring pad 14, and a core training apparatus 16. The tower 12, pad 14, and core training apparatus 16 are physically separate and distinct components that cooperate together to define system 10 to improve and assist in training a person or player during a sport. Specifically, with the goal of scoring a point by moving a basketball 18 (FIG. 6) through the rim 20 attached to a basketball backboard 22 in mind, system 10 is configured to improve the accuracy of a basketball player 24 shooting a basketball 18 at the rim 20.

With primary reference to FIG. 2, tower 12 includes a cross bar or member 26, an adjustable vertical support member 28, and a base member 30. Tower 12 has a top 32 defined by the cross bar 26 and a bottom 34 defined by the base that therebetween define a vertical direction. Base member 30 includes a front edge 36 and a rear edge 38 that therebetween define a longitudinal direction. Base member 30 includes a left edge 40 and a right edge 42 that therebetween define a lateral direction. Base member 30 includes an upwardly facing top surface 44 and a downwardly facing and ground engaging bottom surface 46 each defined by the respective front, rear, left, and right edges.

Vertical support member 28 has a bottom end 48 and top end 50. The bottom end 48 connects to top surface 44 of base member 30 and vertical support member 28 extends upwardly from base member 30. Vertical support member 28 may be adjustable in a conventionally known manner, such as concentric telescoping tubes 54A, 54B, and selectively lockable, via a lock or adjustable member 52, at different heights. Preferably, vertical support member 28 is selectively lockable in a height range along the direction of arrow A (FIG. 2) from about 70 inches to about 140 inches. The height range is measured relative to ground level.

Cross bar 26 includes a first end 56 and a second end 58 and is oriented laterally such that cross bar 26 is generally perpendicular to vertical support member 28. First end 56 of cross bar 26 connects to second end 50 of vertical support member 28. Cross bar 26 extends in a cantilevered manner laterally towards second end 58. In the shown embodiments, cross bar 26 is cylindrical in shape, however, clearly other shapes are entirely possible. Cross bar 26 may further include an inner chamber or cavity configured to store or house electrical components.

Tower 12 includes a speed measuring device 60 housed within cavity. Speed measuring device 60 may include a transmitter/receiver connected to an antenna from which a signal 76 (FIG. 6) is transmitted and to which a signal is received from a moving object such as the basketball 18 released from the player's 24 (FIG. 6) hand traveling towards the rim 20 attached to basketball backboard 22. A timer may be operatively connected to transmitter/receiver including a speed signal detector to detect a physical input speed signal from the moving object (the basketball 18). The moving object 18 creates an input signal connected to the transmitter/receiver. Speed measuring device 60 may further include a processor having logic that interprets and further processes the input speed signal, a timing unit, and an annunciator.

Tower 12 may also include an angle measuring device which may include a transmitter/receiver connected to an antenna from which a signal is transmitted and to which a signal is received from a moving object such as basketball released from the player's hand traveling towards the rim of the basketball hoop. The object (i.e., the basketball) creates an input angle signal connected to the transmitter/receiver as it is shot from the player's hand. Angle measuring device may further include a processor having logic that interprets and further processes the input angle signal, a timing unit, and an annunciator. The angle measuring transmitter/receiver and associated components (the processor, the timing unit, and the annunciator) may be a separate and distinct device from transmitter/receiver and associated components (the processor, the timing unit, and the annunciator) of the speed measuring device, or alternatively, tower 12 may have a unified transmitter/receiver and associated components (the processor, the timing unit, and the annunciator) to simultaneously measure speed of the ball and release angle of the ball from a single device.

Tower 12 may further include a display screen 62. Display screen 62 is preferably a liquid crystal (LCD) display, however other visually or audibly communicative devices are clearly possible. Display screen 62 preferably has a first display area 64 and a second display area 66. First display area displays shot information, such as the release angle or ball speed, from the player's most recent shot. Second display area displays a desired or target shot information, such as the preferred ball velocity or preferred entrance angle, based on the player's release height, distance the player is from the rim 20, and the height of the rim 20. The target shot information is calculated by a computing device (not shown) contained within tower 12 based on the information contained in Table-1 (FIG. 13). An optimal ball velocity or shot speed 70 and an optimal release angle 72 (FIG. 6) detailed in Table 1 cause the ball 18 to enter the rim 20 at an entrance angle 74 (FIG. 6) from about 40 to about 50 degrees. The preferred entrance angle 74 is 45 degrees. The entrance angle 74 is measured from the center 78 of the rim 20 to the center of the ball 18 relative to horizontal as the ball 18 is descending towards the rim 20. The optimal ball velocity 70 is from about 11 mph to about 21 mph, and optimal the release angle 72 of the ball shot from the player's hand is from about 40 degrees to about 75 degrees, as set forth in Table 1. Tower 12 may be further outfitted with an input key pad (not shown) in electrical communication with display 62 to display additional information which may be desirable to the shooter, such as a player's 24 name, or key pad may be useful to input other calculative information such as hoop distance from player 24. For example, one embodiment may require player 24 to input the location or distance from tower 12 to rim 20.

A third display area 68 present on LCD indicates the location of the player 24 relative to the basketball rim 20 or how far away from the rim 20 the shot is being taken. System 10 may include an input device to allow a user to enter this distance information manually or electronically, or system 10 may include an electronic distance measuring unit configured to automatically measure the distance between the basketball rim 20 and the player 24 without the need for the shooter to input the distance information.

Figure 6:
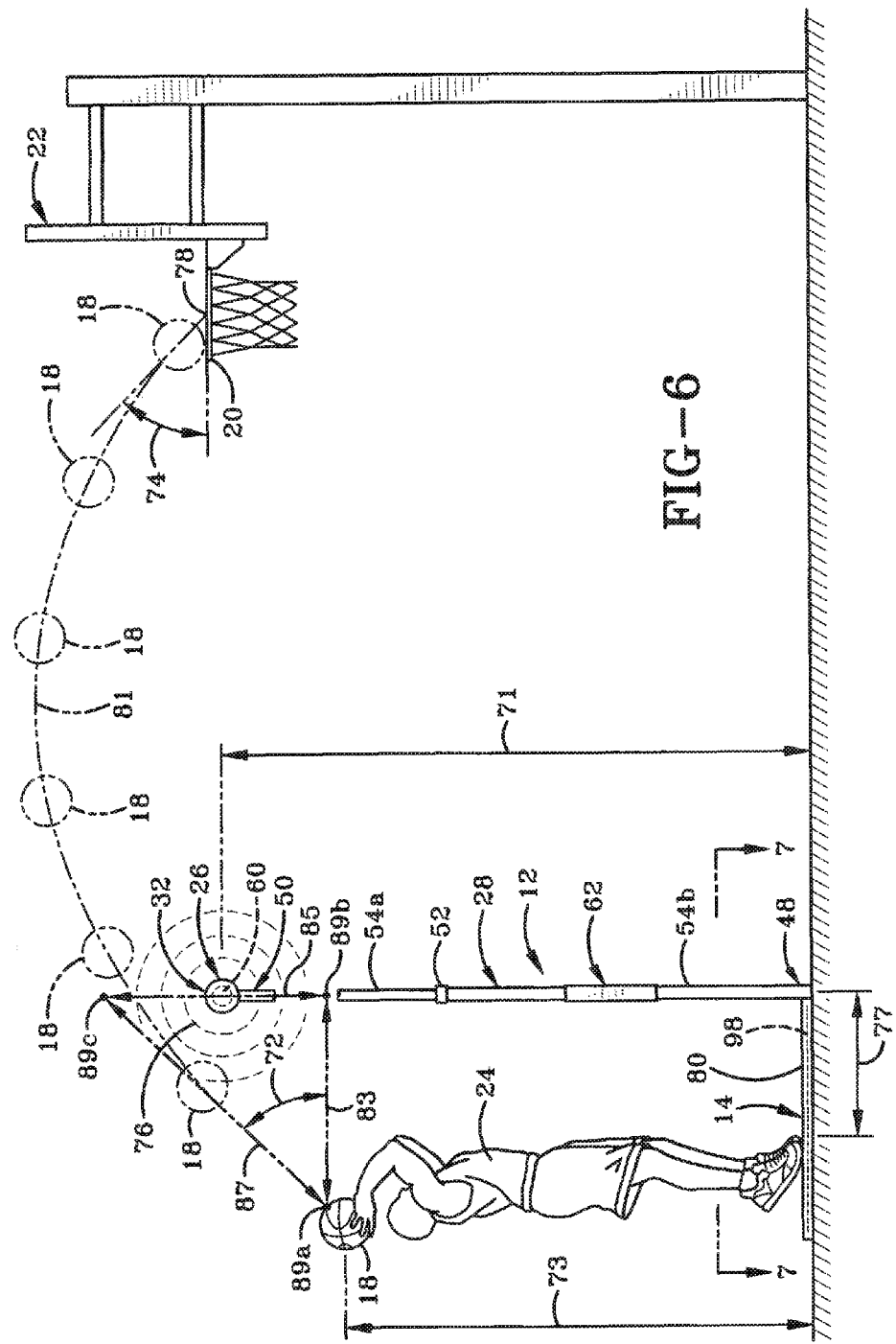
FIG. 6 is an operational side elevation view of a player shooting a ball over the top cross bar of the tower at a proper velocity to cause the ball to enter the hoop at a near forty-five degree entrance angle.
Figure 9:
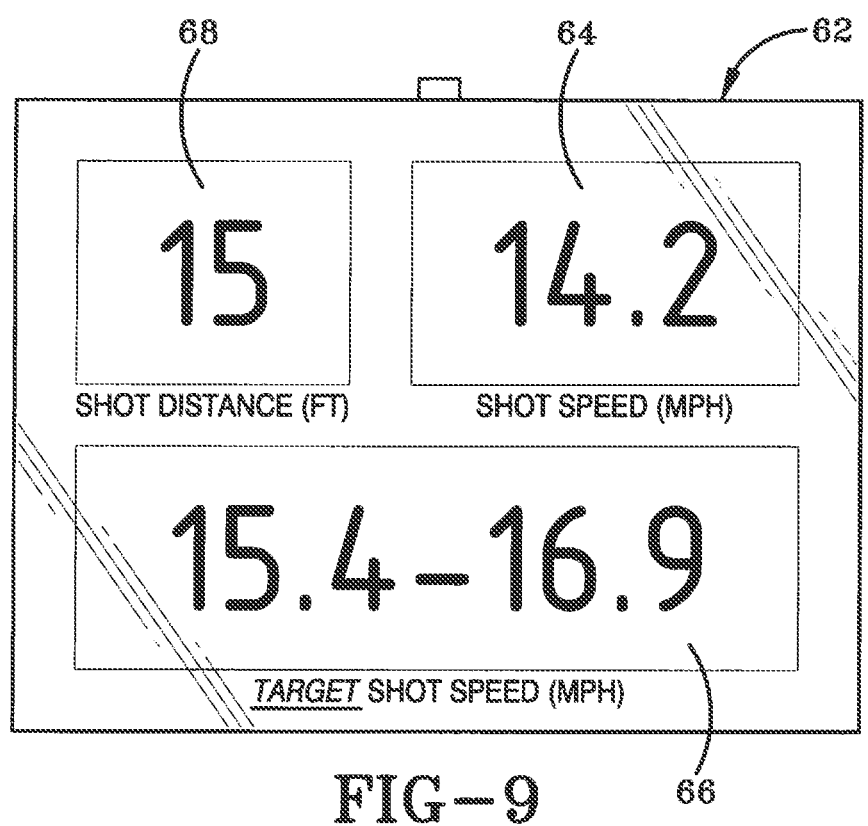
FIG. 9 is an enlarged exemplary view of a display screen of the tower.

Tower 12 and pad 14 are physically separated. System 10 is configured such that tower 12 is positioned longitudinally between the hoop and pad 14. As shown in FIG. 6, the positioning of tower 12 and pad 14 requires the player to shoot the ball vertically over tower 12 or higher than the top 32 of the tower 12. Pad 14 is preferably positioned to partially cover or otherwise lay atop a portion of base member 30 of tower 12.

With primary reference to FIG. 3, the balance and power measuring pad 14 includes generally planar member having an upwardly facing top surface 80 and a downwardly facing and ground engaging bottom surface 82. Pad 14 has a front edge 84 spaced apart and generally parallel to a rear edge 86. Further pad has left 88 and right 90 edges extending from front to back. Pad 14 includes a plurality of spaced apart lines 92 on the top surface 80 of the pad 14. A first set of lines 94 extend longitudinally across the top of pad 14, and a second set of lines 96 extend laterally across top of pad 14. Further, first set of lines 94 perpendicularly intersect second set of lines 96. Preferably, lines 92 are spaced at equal interval distances forming a grid. Both sets of lines 94, 96 may be printed atop the top surface 80 or otherwise be made visible in a conventionally known manner as understood in the art.

Figure 5:
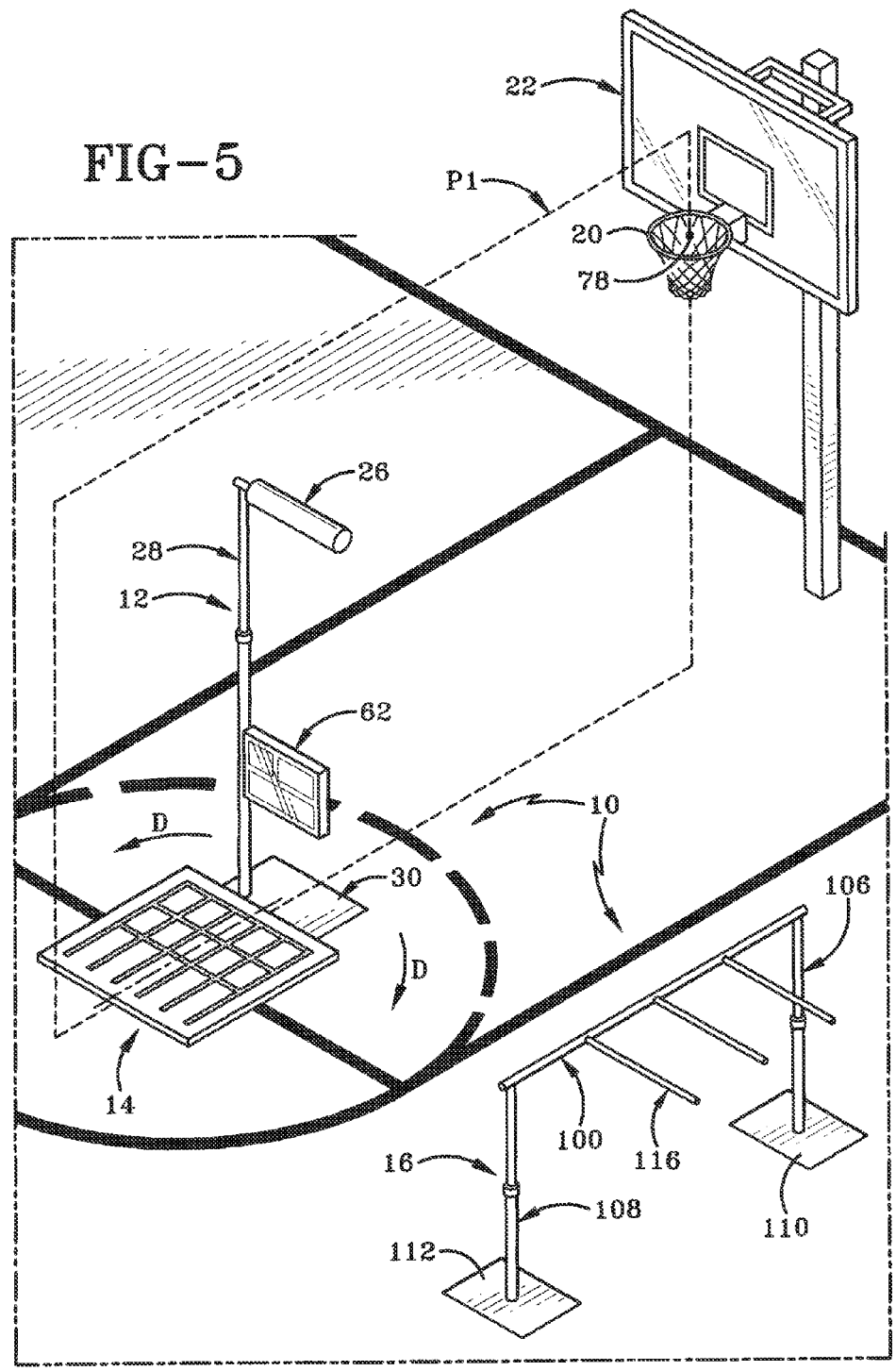
FIG. 5 is an operational perspective view of the present invention depicting proper alignment of the pad and tower relative to the hoop.

As shown in FIG. 5, pad 14 is physically separate and distinct from rim 20 and backboard 22. Pad 14 is aligned with hoop such that an imaginary center line is in planar alignment P1 with the center 78 of the rim 20. Pad 14 is rotated or physically maneuvered in the direction of Arrow D to provide proper alignment in plane P1. Note that a printed line need not be in alignment with the center of the hoop, as is shown in FIG. 5. The center line is an imaginary line extending from front to back of pad midway between left and right edges 88, 90.

Pad 14 further includes a plurality of pressure point indicators 98 on the top surface of the pad. Pressure point indicators 98 identify through a visual representation aid where the player's feet are located in a pre-shot position (FIG. 7). Then after a player takes a shot, the pressure point indicator indicate one or more of the following, (a) whether the player has landed on the balls of the player's feet, (b) whether the player has landed on a side of the foot, and (c) whether the player has landed on the heel of the foot. Pressure point indicator 98 can be a non-electrical unit that is configured to change colors when certain amounts of pressure are applied, or the pressure indicator may be an electric device in electrical communication with a computer (not shown) to electrically collect the exerted pressure data and using logic display the information on a screen (not shown) to the player.

Figure 4:
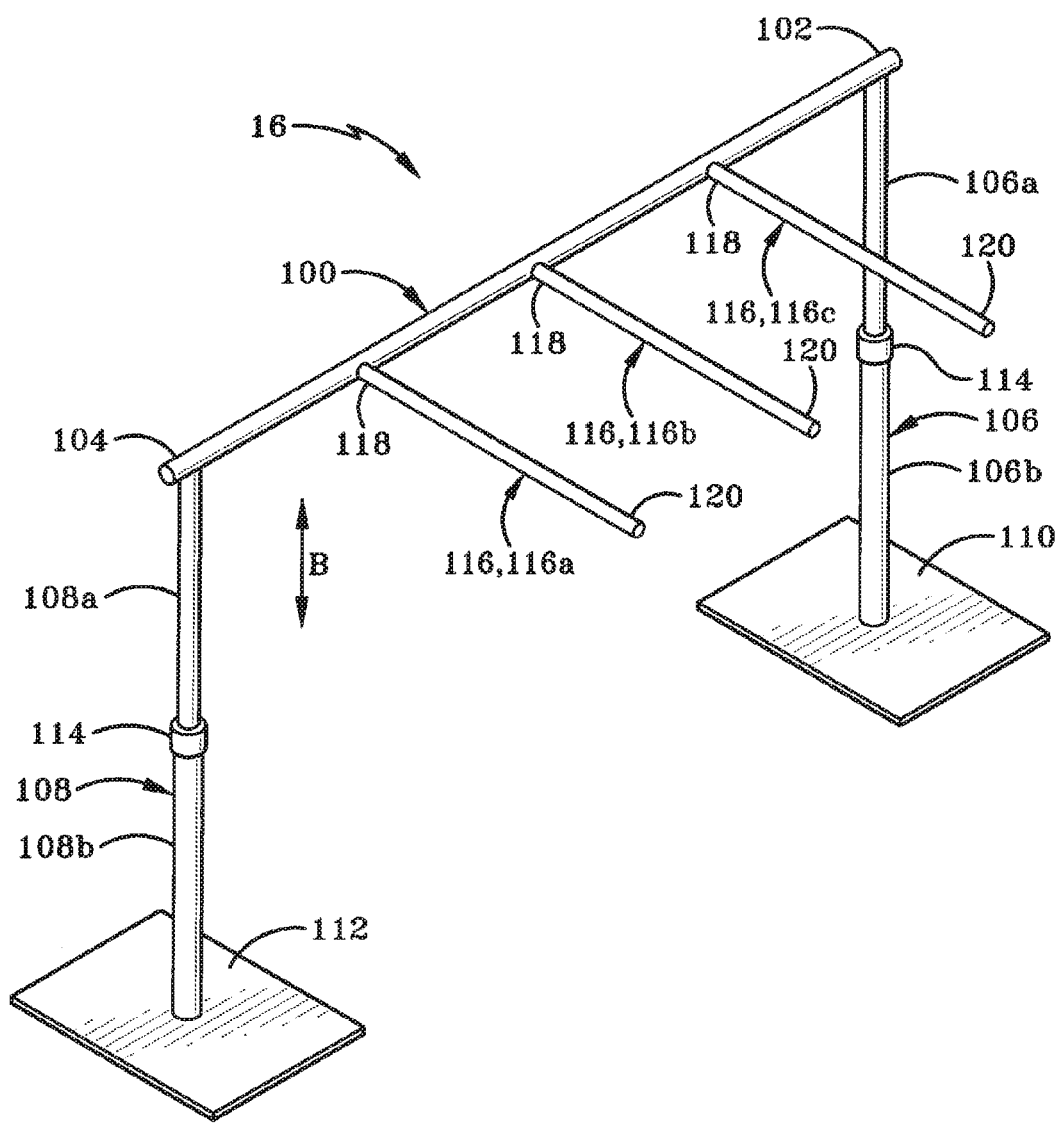
FIG. 4 is an enlarged perspective view of the core training apparatus.

With primary reference to FIG. 4 and FIG. 10, the core training apparatus 16 includes a top bar 100 having a first end 102 and a second end 104. Core training apparatus 16 further includes a first vertical support member 106 connected to a base 110 and a second vertical support member 108 connected to a second base 112. Core training apparatus 16 further includes a plurality of tines 116 which extend in a cantilevered manner outwardly from a first end 118 attached to top bar 100 towards a free end 120. As shown in FIG. 4, a preferred embodiment includes three tines 116A, 116B and 116C which are spaced equidistant from one another with tine 116B being positioned between tines 116A and 116C. Tines 116 are substantially horizontal and generally parallel to the ground surface. Tines 116 are preferably releasably attached to top bar 100 and may be reattached on an opposing side of top bar 100 if desired by the user.

Top bar 100 is vertically adjustable along the direction of arrow B by unlocking lock collar 114 to selectively raise or lower the telescoping concentric members 106A, 106B that collectively define first vertical support member 106, and first and second concentric members 108A and 108B which respectively define second vertical support 108. Top bar 100 is set at a height to promote a player 24 dribbling a basketball 18 to move beneath tines 116 in the direction of arrow C all while maintaining an athletic stance as shown in FIG. 10.

With primary reference to FIG. 11, Graph 1 details the trajectory information for a "Free Throw" shot from a range of release heights. For the purposes of this explanation, a free throw refers to a basketball shot from fifteen feet from the basketball rim 20. The horizontal axis of Graph 1 represents the horizontal distance (X; measured in feet) the player is from the rim 20. The vertical axis (Y) represents the height of the rim. Graph 1 indicates that rim center 78 should be positioned at X=0 and Y=10. The player shooting the basketball should be positioned at X=15, and Y=a varying height depending on the player's 24 reach. The term reach for the purposes of this detailed description refers to the vertical height at which the ball leaves the player's 24 hand when the basketball is shot towards the basketball rim 20. For example, if a player has a vertical reach of eight feet (X=15, Y=8), the ball is shot along a trajectory path that reaches an approximate maximum height of about 13.25 feet about six and a half feet away from the rim (X=13.25, Y=6.5).

With primary reference to FIG. 12, Graph 2 details the trajectory information for a "3-point shot" shot from a range of release heights. For the purposes of this explanation, a 3-point shot refers to a basketball shot from twenty feet from the basketball rim 20 and is worth 3 points. The horizontal axis of Graph 1 represents the horizontal distance (measured in feet) the player is from the hoop. The vertical axis represents the height of the rim. Graph 1 indicates that rim center 78 should be positioned at X=0 and Y=10. The player shooting the basketball should be positioned at X=20, and Y=a varying height dependent on the player's 24 reach. For example, if a player has a vertical reach of eight feet (X=20, Y=8), the ball is shot along a trajectory path that reaches an approximate maximum height of about 14.5 feet about nine feet away from the rim (X=14.5, Y=9).

While the examples detailed in Graph 1 (FIG. 11) and Graph 2 (FIG. 12) are exemplary trajectory patters of basketballs shot towards a rim at a standard height of ten feet, clearly, these trajectory paths 81a (FIG. 11) and 81b (FIG. 12) could be reconfigured for a basketball rim at a lower height.

The trajectory path 81a of Graph 1 (FIG. 11) and path 81b of Graph 2 (FIG. 12) are to be read in conjunction with the shot data provided in Table 1 (FIG. 13). As shown in FIG. 13, Table 1 provides the preferred release angle ranges 72, shot speed ranges 70, the cross bar height 71 (referred to in Table 1 as the "Shooters Mark Height"), and the horizontal distance 77 the tower should be positioned in front of the player for a variety of reach heights 73 of a player shooting a ball from a given shot distance 75. For example, if a player has a reach height 73 of eight feet and the player is shooting a shot from ten feet 75, then the release angle 72 is from about 51 to about 56 degrees, the shot speed shot 70 is from about 12.7 mph to about 13.8 mph, the cross bar height 71 is about 116 inches above the ground, and the cross bar 26 of tower 12 is positioned 2 feet forward from the shooter. In another example, if a player has a reach height 73 of nine feet and the player is shooting a shot from twenty feet 75, then the release angle 72 is from about 46 to about 57 degrees, the shot speed 70 is from about 17.8 mph to about 19 mph, the cross bar height 71 is about 127 inches above the ground, and the cross bar 26 of tower 12 is positioned 3 feet forward from the shooter. These measurements collectively ensure that the shot ball enters the rim at a preferred entrance angle 74 (FIG. 6) of about 45 degrees and follows a ball trajectory pathway 81 (FIG. 6) identified in FIG. 11 as free throw trajectories 81a or in FIG. 12 as 3-point shot trajectories 81b, respectively.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 14:
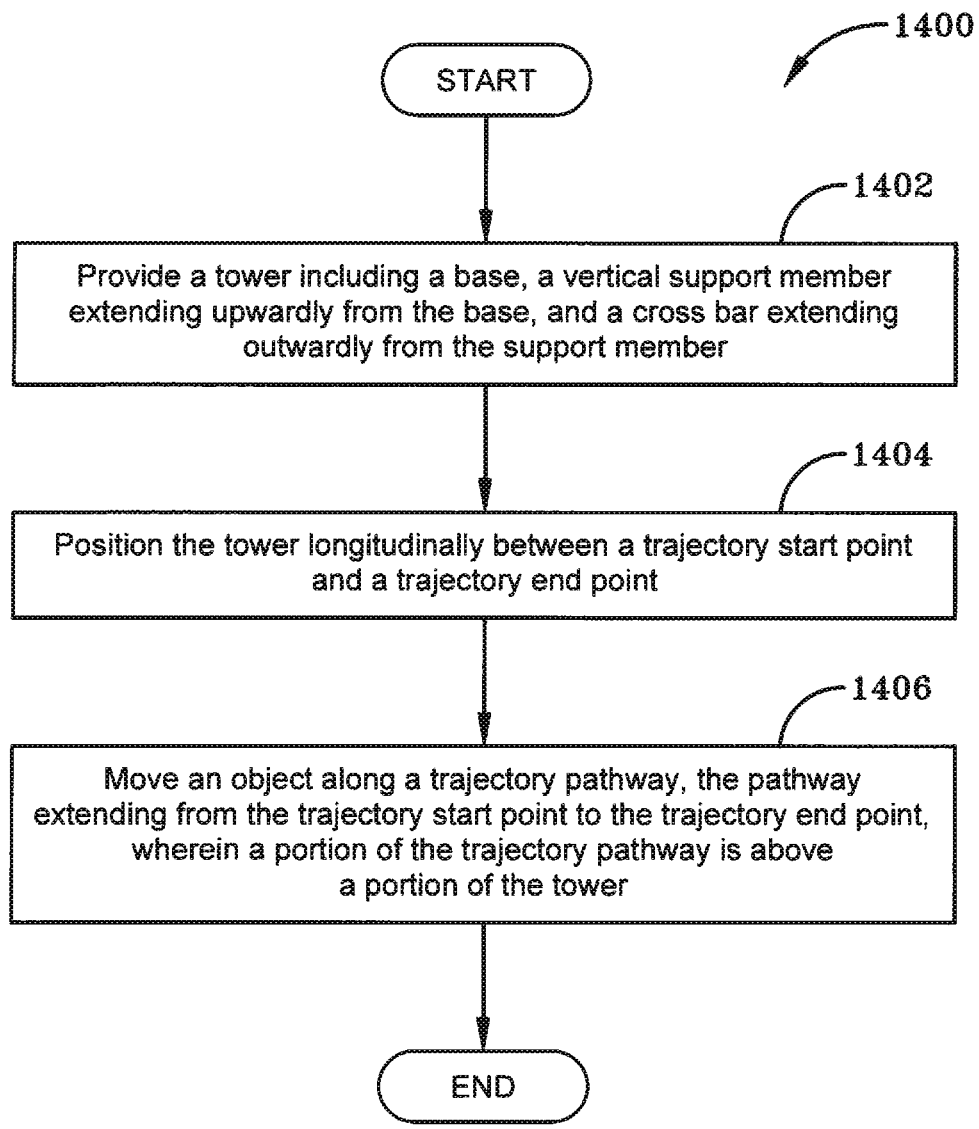
FIG. 14 is an exemplary method flow chart of providing a cross bar positioned between a player and a hoop, and then shooting the ball over the bar towards the hoop within a speed range such that the ball enters the hoop at a near forty-five degree angle.

FIG. 14 illustrates a method 1400 of training an athlete's shooting technique. The method at 1400 should provide a tower including a base, a vertical support member extending upwardly from the base, and a cross bar extending outwardly from the support member at 1402; then position the tower longitudinally between a trajectory start point and a trajectory end point at 1404; then move an object along a trajectory pathway, the pathway extending from the trajectory start point to the trajectory end point, wherein the a portion of the trajectory pathway is above a portion of the tower at 1406.

Additional methods include a method of shooting a ball towards a hoop comprising the steps of providing a cross bar positioned between a player and the hoop. Then, shooting the ball towards the hoop at a speed from about 11 mph to about 21 mph, wherein the ball travels over the top of the cross bar, and the ball enters the hoop at an entrance angle from about 42 to about 48 degrees relative to horizontal at.

In accordance with one aspect of an embodiment of the present invention, system 10 comprises of three components: the tower 12, the pad 14 and lastly, the core apparatus 16. In the preferred embodiment, tower 12 can change a player who has a release angle below the preferred range in about less than five shots, and have them shooting a preferred release angle to the hoop 22 with little or no interaction with a human coach. With release angle 72 in the preferred range, the ball enters the basket at a preferred entrance angle for a softer, more accurate impact with the rim 20.

In accordance with one aspect of an embodiment of the invention, system 10 will measure the speed of the player's shot, providing them with instant feedback so they may quickly adjust and improve their next shot. Further, shooting over the cross bar 26 will ensure a proper release angle. The tower 12 may have a computer on it to measure the distance from the rim 20 to the tower 12. This measuring device will be beneficial when there are no lines on the court. In order to attain the correct shooting rhythm it is necessary to practice at a known distance. Together, these features give the shooter the preferred entry arc required giving the player a higher percentage for the ball to go in the basket. Additionally, system 10 increases the revolutions per second of the ball, which helps lower rim impact. With the right speed and angle, the ball hits inside the rim 20 or on the top part of the ball instead of the bottom of the ball or top of the rim 20, which is a high impact and low percentage.

Due to the fact that the reach height 73 (FIG. 13) is set individually, system 10 can be implemented by players of all sizes. System 10 will be able to change the basket to 6', 7', 8', 9' heights and the information will be entered into the computer to provide the same factoring used on the 10' basket. Further tower 12 is vertically adjustable is compensate for the change in basketball hoop height.

In accordance with another aspect of the present invention, system 10 allows a player to shoot about 200 shots in an hour with instant feedback on the footwork, body position and rhythm with each and every shot. System 10 will enable a player to maintain perfect practice while simultaneously developing excellent muscle memory. The pad 14 is designed so players understand the most important parts or fundamentals of their game; footwork, base control and balance while dribbling and shooting. These elements create the power to get into the zero motion stance required to get the player's 24 legs, core and shooting arm aligned to shoot with the proper speed 70 and release angle 72 to get the ball straight towards the rim with better ball spin and arch for an optimal entry angle 74.

In accordance with another aspect of the present invention, system 10 allows a player 24 to traverse underneath tines 116 of core training apparatus 16 and position themselves onto pad 14. Player 24 will pivot their feet to get square or aligned with rim 20 of the basketball hoop 22 as they enter on an angle cut. This alignment with the rim 20 is beneficial off the dribble or as the player 24 catches the basketball 18 from a pass and shoots the ball 18. This is useful in teaching player 24 to stay low when coming off the dribble to get into their pre-shot position or coming off screens to simply catch and shoot.

In operation, as shown in FIG. 7-8C, pad 14 is configured to properly align the player's feet in each of the pre-shot (FIG. 7) and post-shot (FIG. 8A) positions. Player 24 demonstrates good balance when they launch from and land on the balls of their feet in each of the pre-shot and post-shot positions. If player 24 lands in the post-shot position leaning to the left or right, pressure points will be visible on indicator 80. Landing on their heels will show their footprint indicating their weight is on the back. Beginning in the pre-shot position (FIG. 7), the player's feet are positioned behind a first lateral line 96A. Each one of player's feet is positioned between two longitudinally extending lines 94A, 94B and 94C, 94D respectively. The alignment of the player's feet in the pre-shot position (FIG. 7) aligns the remaining portions of the player's body with the basketball hoop and rim. To shoot the ball, the player should bend at their knees and jump off the balls of their feet and shoot the ball 18 towards the rim 20 with their hands while airborne. The jumping motion should propel the player 24 forwards. After the player shoots the basketball 18 over the cross bar 26 towards the rim 20, the player 24 should land in the post shot position (FIG. 8A). In the post-shot position, the player's feet are positioned behind a second lateral line 96B but forward of the first lateral line 96A. This indicates that the player has jumped forward during the shot. Each foot should still be positioned between the same two longitudinal lines 94A, 94B and 94C, 94D from the pre-shot position. Lines 92 atop pad 14 provide instant feedback as to where the player jumped from and where they landed. As shown in FIG. 8B, if a player lands with one of their feet, in this case their left foot, too far forward they will be able to look down and see that their foot extends forward of the second lateral line 96B. FIG. 8B represents a post-shot position that is incorrect and thus providing visual instant feedback to the player so they may correct themselves for the next shot to land in a preferred post-shot position as detailed in FIG. 8A. Similarly, FIG. 8C details another incorrect post-shot position where the player has jumped too far forward and also did not stay between the respective longitudinal lines. Lines 92 are important for keeping the ball traveling along an arc 81 (FIG. 6) towards the hoop wherein the arc lays in plane P1. By landing in the post-shot position detailed in FIG. 8A, the player can minimize missed shots to the left and right of the rim.

In operation and with primary reference to FIG. 6, tower 12 requires player 24 to shoot ball 18 over the top of cross bar 26. In order to shoot the ball along trajectory 81 over bar 26, player 24 must release ball 18 at the proper release angle 72 and a proper ball velocity 70 (FIG. 13). A first distance 83 extends between a first point 89a adjacent the release point of ball 18 to a second point 89b on tower 12. First distance 83 forms an imaginary horizontal leg of a triangle. A second distance 85 extends from the second point to a third point 89c positioned adjacent the trajectory pathway 81, forming an imaginary vertical leg of a triangle. A hypotenuse distance extends from the first point 89a to the third point 89c. The release angle 72 is defined by the angle extending between hypotenuse distance 87 and first distance 83 (i.e., the horizontal leg).

The proper release angle 72 and ball velocity 70 for a person having a given reach height 73 are found in Table 1 of FIG. 13, the entirety of which is incorporated by reference herein. Tower 12 is vertically adjustable to a height 71 determine in accordance with the values identified in Table 1, preferably within a range from about 70 inches to about 140 inches relative to the ground. Further, tower 12 is longitudinally positioned a distance 77 in front of player in accordance with the values identified in Table 1, preferably spaced a horizontal distance 77, measured from the player's feet the bottom 48 of vertical support member, from about 2 feet to about 3 feet. Collectively, the release angle 72, shot speed 70, tower height 71, and tower longitudinal position 77 for a player 24 having a reach height 73 taking a shot from a given distance 75 will cause the ball 18 to enter the rim 20 of hoop 22 at the preferred entrance angle 74. The preferred entrance angle 74 is from about 40 to about 50 degrees, specifically the preferred entrance angle 74 being 45 degrees. The preferred entrance angle 74 is defined as the angle between the descending trajectory 81 and horizontal level of rim 20.

In operation and with continued reference to FIG. 6, the transmitter/receiver of speed measuring device 60 housed within the cross bar 26 transmits and receives a signal that is capable of capturing the speed of the basketball after it has been released from the player's hand. Preferably, transmitter/receiver transmits and receives a continuous wave signal from which the basketball 18 speed can be captured by returning a Doppler signal. The continuous wave signal may be an ultrasonic signal, an electromagnetic signal or some other continuous wave signal. When a portion of a transmitted continuous wave signal is reflected from the basketball 18 that is moving toward or away from the antenna, the received signal can contain a Doppler shift that is proportional to the frequency of the transmitted signal and the velocity of the basketball toward or away from the antenna. A detector, operatively connected to the timer, has an input connected to the transmitter/receiver to detect the amount of the Doppler shift between the transmitted and Doppler-shifted received signals. Detector then outputs a Doppler signal to the processor, which may be a microprocessor having logic. The processor interprets and derives information from the Doppler signal and correlates it with information from a timing unit to measure the duration of the basketball 18 shot, which is the time from when the ball 18 leaves the player's hand to the time the basketball 18 makes contact with the rim 20. The microprocessor then outputs a signal or multiple signals to the annunciator. The processor also derives the speed of the basketball 18 and outputs the basketball 18 speed to the annunciator.

The annunciator converts an output signal received over a wired or wireless link from the processor into a form for use or interpretation. Stated otherwise, annunciator converts the outputs into an audible or visual representation perceivable by the player. By way of non-limiting example, annunciator may be an LCD display 62 on which the basketball speed is displayed 64 to the player as a direct and immediate measurement of each shot of the basketball by the player.

The processor may be a microprocessor capable of interpreting the Doppler signal from the detector to determine whether or not an object, namely the basketball 18, located in the field of the antenna is moving, and if so at what speed. The detection of motion is also useful to the processor in controlling the operation of the timer. This enables the timer to be operated by the player or other user in a hands-off manner.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Alternative embodiments of system 10 may include versions of tower 12 having different electrical components made a part thereof to perform different additional functions. By way of non-limiting example, an alternative embodiment of tower 12 may include a distance measuring device, such as a laser distance finder, to automatically establish the distance between the player 24 and the basketball hoop 22, and contain the necessary electric devices and logic to re-compute the necessary shot data to establish a preferred entrance angle.

In accordance with one aspect of an embodiment of the invention, system 10 will be easily collapsible for easy and convenient storage and transportation. In another alternate embodiment of the present invention 10, tower 12 having base 30 are configured to be one integral unit that unfolds from a collapsed position into an erect position, easily by player 24. Base 30 and vertical support member 28 may pivotably connect to facilitate the unfolding. Further, crossbar 26 may pivotably engage vertical support member 28 to facilitate the unfolding and collapsible manner. Preferably, this alternate embodiment will have measurements of approximately 4 feet long by 3 inches high by about 12 inches wide in the collapsed position. The collapsible nature of tower 12 will operate by a plurality of hinges, axles, or pivot points, as one would understand in the art. This is very desirable for manufacturing and logistical purposes as a standard shipping pallet is limited to lengths of 48 inches.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A sports training system comprising in combination:
   a tower including:
      a base member;
      a vertical support member extending upwardly from the base member;
      a crossbar extending outwardly from the vertical support member;
   a pad positioned near the base member, the pad including a top surface having means for indicating a pre-shot position and a post-shot position of a player;
   a core training apparatus, separate and distinct from the pad and the tower positioned adjacently thereto adapted to promote an athletic stance, wherein the core training apparatus comprises:
      a frame; and
      a plurality of cantilevered tines extending outwardly from the top of the frame, the tines defining a player passageway there beneath; and
   wherein the training system is adapted to allow a player to shoot a ball over the cross bar towards a target with a goal of accurately scoring a point.

2. The sports training system of claim 1, wherein the tower further comprises: an adjustable member connected to the vertical support member and adapted to move the cross bar to a selected height in a range from 70 inches to 140 inches relative to the ground.

3. The sports training system of claim 1, wherein the crossbar further comprises:
   a free end;
   a fixed end connected to the vertical support member, said cross bar extending in a cantilevered manner from the fixed end to the free end.

4. The sports training system of claim 1, further comprising:
   an electric device connected to the tower in communication with the ball, and wherein the electric device measures the velocity of the ball as the ball moves towards the target; and
   a digital display in communication with the electric device displaying the velocity of the ball to the player.

5. The sports training system of claim 1, further comprising:
   a horizontal player spacing distance, the horizontal player spacing distance measured from the player's feet to a bottom end of the vertical support member, the horizontal player spacing distance is in a range from 2 feet to 3 feet.

6. The sports training system of claim 1, wherein the pad comprises at least one pressure point indicator to indicate, one or more of the following, (a) whether the player has a proportional weight distribution across a foot, (b) whether the player is has a majority of their weight on the ball of the player's foot, (c) whether the player has a majority of their weight on a side of the foot, and (d) whether the player has a majority of their weight on the heel of the foot.

7. A sports training system comprising in combination:
   a basketball rim attached to a backboard;
   a basketball that a player shoots towards the rim with a goal of moving the basketball through the rim;
   a moveable tower including:
      a folding base member,
      a telescoping vertical support member extending upwardly from the base member, and
      a crossbar extending outwardly from an upper end of the vertical support member;
   a pad distinct from the moveable tower positioned near the base member and, the pad including a top surface having means for indicating a pre-shot position and a post-shot position of a player;
   the pad further including:
      a plurality of longitudinally extending indicator lines on the top surface of the pad, wherein the player's feet are positioned between a pair of said plurality of longitudinally extending indicator lines in the pre-shot position; and
      a plurality of laterally extending indicator lines on the top surface of the pad, wherein the player's feet are positioned behind one of said plurality of laterally extending indicator lines in the pre-shot position; and
   wherein the tower is positioned between the pad and the basketball rim such that the player shoots the ball over the cross bar.

8. The basketball shooting and training system of claim 7, further comprising: a tower that is separate and distinct from the pad, the tower including a laterally extending crossbar adjacent a top end of the tower, wherein the tower is positioned between the pad and the basketball rim such that the player must shoot the basketball over the cross bar.

9. The basketball shooting and training system of claim 8, further comprising: a core training apparatus, separate and distinct from the pad and the tower, wherein the core training apparatus is positioned adjacent the pad and the core training apparatus adapted to promote an athletic stance when the player is in the pre-shot position.

10. The basketball shooting and training system of claim 8, wherein the player stands atop the pad between 2 feet to 3 feet from the tower.

11. The basketball shooting and training system of claim 7, wherein the pad further comprises at least one pressure point indicator to indicate, one or more of the following, (a) whether the player has a proportional weight distribution across a foot, (b) whether the player is has a majority of their weight on the ball of the player's foot, (c) whether the player has a majority of their weight on a side of the foot, and (d) whether the player has a majority of their weight on the heel of the foot.

* * * * *